United States Patent
Yamaguchi et al.

(10) Patent No.: US 6,205,092 B1
(45) Date of Patent: Mar. 20, 2001

(54) MAGNETO-OPTICAL RECORDING AND REPRODUCING APPARATUS AND METHOD

(75) Inventors: Atsushi Yamaguchi; Satoshi Sumi, both of Gifu; Yoshihisa Suzuki, Aichi; Kenji Tanase, Gifu, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 08/976,010

(22) Filed: Nov. 21, 1997

(30) Foreign Application Priority Data

Dec. 2, 1996 (JP) .................................................. 8-321539

(51) Int. Cl.[7] .................................................. G11B 11/00
(52) U.S. Cl. .............................................. 369/13; 360/114
(58) Field of Search ................................ 369/14, 13, 110, 369/112, 121, 109, 54, 44.37, 44.38, 53, 116, 275.2; 360/114, 59, 66

(56) References Cited

U.S. PATENT DOCUMENTS

| | | | |
|---|---|---|---|
| 4,618,901 | * | 10/1986 | Hatakeyama et al. ................ 360/114 |
| 4,626,679 | * | 12/1986 | Kuwayama et al. ............ 250/227.11 |
| 5,018,119 | * | 5/1991 | Aratani et al. ......................... 369/13 |
| 5,218,581 | * | 6/1993 | Ohta et al. ............................. 369/13 |
| 5,245,491 | * | 9/1993 | Horie et al. .......................... 360/114 |
| 5,422,865 | * | 6/1995 | Katayama et al. ..................... 369/13 |
| 5,513,164 | * | 4/1996 | Tanaka et al. ....................... 369/112 |
| 5,726,955 | * | 3/1998 | Yonezawa et al. .................... 369/13 |
| 5,886,958 | * | 3/1999 | Yonezawa et al. .................... 369/13 |

* cited by examiner

*Primary Examiner*—Ali Neyzari
(74) *Attorney, Agent, or Firm*—Armstrong, Westerman, Hattori, McLeland & Naughton

(57) ABSTRACT

A magneto-optic recording medium reproduction device includes a multi-clad, step index optical fiber, a semiconductor laser arranged on one end surface side of the optical fiber for providing laser beam to one end surface of the optical fiber, a photodetector arranged on one end surface side of the optical fiber and receiving laser beam from one end surface of the optical fiber, and a magnetic head for applying an alternating field to the magneto-optic recording medium. Since the other end surface of the optical fiber is arranged adjacent to the magneto-optic recording medium, an accurate signal can be reproduced even from an extremely small recorded domain. Furthermore, since an alternating field is applied to the magneto-optic recording medium, a domain transferred from a recording layer of the magneto-optic recording medium to a reproducing layer is expanded and a large reproduced signal can be obtained from the expanded domain.

10 Claims, 12 Drawing Sheets

REPRODUCED SIGNAL

ALTERNATING MAGNETIC FIELD

MAGNETO-OPTICAL RECORDING AND REPRODUCING APPARATUS AND METHOD

BACKGROUND OF THE INVENTION

1. Field of the Invention

The present invention relates to a magneto-optic recording medium reproduction device, and more specifically to that employs near-field light and domain expansion.

2. Description of the Background Art

Magneto-optic recording medium has been noted as a highly reliable recording medium with rewritability and high storage capacity and has been put to practical use as the memory for computer and the like. However, further high density recording and reproducing technique has been sought for as the amount of information is further increased and the device is further miniaturized.

High density recording and reproducing technique is constituted by medium technique and device technique. The former technique includes a narrowed pitch of medium, an improved resolution for reproduction by means of magnetic multilayered film, and the like. The technique by means of magnetic multilayered film employs the fact that the intensity of laser spot forms Gaussian distribution to selectively transfer the magnetized state of a recording layer to a reproducing layer and read the magnetized state of the reproducing layer, and at present mainly has the three types of FAD (Front Aperture Detection), RAD (Rear Aperture Detection) and CAD (Center Aperture Detection). According to these techniques, the front or rear side or the vicinity of the center of a laser spot serves as a reproduction aperture to reduce the substantial diameter of a laser spot and thus increase reproduction density. The latter technique includes optical super-resolution technique for obtaining a condensation spot which exceeds the diffraction limit of laser beam, reduction in wavelength of laser beam and the like. Furthermore, near-field light recording and reproducing technique is provided for positioning one end surface of an optical fiber adjacent to a magneto-optic recording medium and irradiating the magneto-optic recording medium with laser beam from the optical fiber to record and reproduce signals. This technique allows formation of a recording domain of approximately 0.06 $\mu$m.

For reproduction by near-field light recording and producing technique, however, the reproduced signals which are detected are small due to the small domain, sufficient C/N ratio cannot be obtained, and reproduced signals are disadvantageously lost.

SUMMARY OF THE INVENTION

Therefore, an object of the present invention is to provide a magneto-optic recording medium reproduction device capable of accurately reproducing a signal recorded in a small domain, and a method of reproducing the same.

Another object of the present invention is to provide a magneto-optic recording medium suitable for the reproduction device and reproduction method mentioned above.

According to one aspect of the present invention, a magneto-optic recording medium reproduction device for reproducing a signal from a magneto-optic recording medium with a recording layer and a reproducing layer includes a laser device, an optical device, a detector and a magnetic field application device. The laser device oscillates laser beam. The optical device has an end surface adjacent to the magneto-optic recording medium, and irradiates the magneto-optic recording medium with the laser beam from the laser device via the end surface and receives the laser beam reflected from the magneto-optic recording medium via the end surface. The detector detects the laser beam received by the optical device. The magnetic field application device applies an alternating magnetic field to the magneto-optic recording medium to expand and shrink a domain created in the reproducing layer.

Preferably, the optical device includes an optical fiber which has a core, a first clad and a second clad. The core has a first refractive index. The first clad is formed around the core and has a second refractive index smaller than the first refractive index. The second clad is formed around the first clad and has a third refractive index smaller than the second refractive index.

Preferably, the optical device includes a first optical fiber and a second optical fiber. The first optical fiber has a first core and a first clad. The first core has a first diameter and a first refractive index. The first clad is formed around the first core and has a second refractive index smaller than the first refractive index. The second optical fiber has a second core and a second clad. The second core has a second diameter larger than the first diameter, and a third refractive index. The second clad is formed around the second core and has a fourth refractive index smaller than the third refractive index.

Preferably, the optical device a solid immersion lens, an objective lens and an optical system. The solid immersion lens has an end surface and a curved surface opposite to the end surface. The objective lens is arranged on the curved surface side of the solid immersion lens and is coaxial with the solid immersion lens. The optical system forms a first laser beam with a first diameter and a second laser beam with a second diameter larger than the first diameter coaxially incident on the objective lens.

Preferably the reproduction device further includes a diffraction grating element for transmitting the laser beam from the laser device straight and diffracting the laser beam received by the optical device towards the detector. The diffraction grating element further preferably includes a hologram.

According to another aspect of the present invention, a magneto-optic recording medium reproduction method for reproducing a signal from a magneto-optic recording medium having a recording layer and a reproducing layer magnetized in a predetermined direction includes the steps of: irradiating a magneto-optic recording medium with laser beam having a mixed intensity distribution of first and second intensity distributions each having a different beam diameter; applying an alternating magnetic field to the magneto-optic recording medium to expand and shrink a domain created in a reproducing layer when the magneto-optic recording medium is irradiated with the laser beam; and detecting a laser beam reflected from the magneto-optic recording medium.

Preferably, the step of detecting includes detecting the laser beam when a reproduced signal based on the intensity of the laser beam reflected from the magneto-optic recording medium is the greatest reproduced signal.

Still preferably, the step of detecting includes detecting the laser beam at the timing of applying a magnetic field in the direction opposite to the predetermined direction in which the reproducing layer is magnetized.

According to still another aspect of the present invention, a magneto-optic recording medium includes a substrate, a recording layer and a reproducing layer. The recording layer is positioned on the substrate and formed of a magnetic material. The reproducing layer is positioned on the recording layer and formed of a magnetic material.

The magneto-optic recording medium still preferably includes an intermediate layer positioned between the recording layer and the reproducing layer and formed of a non-magnetic material.

Preferably, minimum size of stable domain of the reproducing layer is larger than that of the recording layer.

The magneto-optic recording medium reproduction device is miniaturized since it uses an optical device having an end surface adjacent to the magneto-optic recording medium, rather than an objective lens, to irradiate the magneto-optic recording medium with laser beam. Furthermore, the reproduction device transfers a domain of the recording layer to the reproducing layer and expands the transferred domain size to reproduce a signal so that the intensity of the reproduced signal is improved and consequently a sufficient high C/N ratio can be obtained.

Furthermore, a so-called multi-clad, step index optical fiber is used as the optical device in the reproduction device to irradiate the magneto-optic recording medium with laser beam. Thus, the intensity of the beam spot is significantly increased only at the center, only a desired domain within the recording layer is transferred to the reproducing layer, and consequently a precise reproduced signal can be obtained.

Alternatively, a so-called single-clad, step index optical fiber, and a single-clad step index optical fiber having a larger core than that of the other optical fiber are used as the optical device in the reproduction device to irradiate the magneto-optic recording medium with laser beam. Thus, only the intensity of the beam spot is significantly increased only at the center and consequently a precise reproduced signal can be obtained as well.

Alternatively, a solid immersion lens is used as the optical device in the reproduction device to allow two laser beams different in diameter incident coaxially on the objective lens. Thus, only the intensity of the beam spot is significantly increased only at the center and consequently a precise reproduced signal can be obtained as well.

Furthermore, the reproduction device employs a hologram to transmit laser beam from the laser device straight and diffract the laser beam reflected from the magneto-optic recording medium. Thus, the laser device and the detector can be arranged in a same plane and this can reduce the size of the optical system formed of the laser device and the detector.

According to the magneto-optic recording medium reproduction method, a laser beam reflected from an expanded domain is detected at the timing of applying a magnetic field in the direction opposite to that in which the reproducing layer is initially magnetized, and a sufficiently large reproduced signal can thus be obtained.

Furthermore, since the recording layer and the reproducing layer are positioned successively from the substrate side of the magneto-optic recording medium, laser beam can be radiated from the side opposite to the substrate. This allows an end surface of the optical fiber or the like to be arranged more adjacent to the recording layer and thus a signal to be reproduced from a smaller recording domain.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
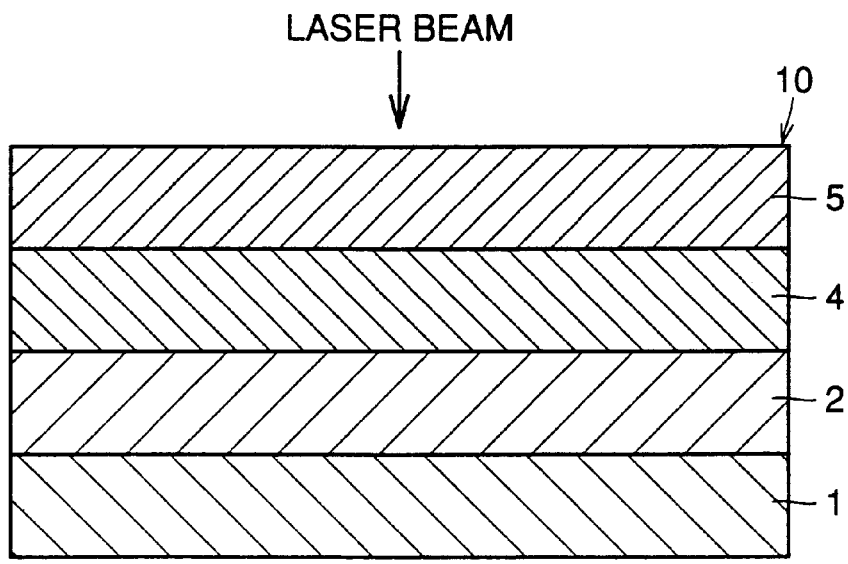
FIG. 1 shows a cross section showing one example of a magneto-optic recording medium suitable for a reproduction device according to a first embodiment of the present invention.

Embodiments of the present invention will now be specifically described with reference to the drawings. Identical or corresponding portions in the figures are labeled by identical reference characters and a description thereof is not repeated.

First Embodiment

A configuration of a magneto-optic recording medium will first be described suitable for a magneto-optic recording medium reproduction device according to a first embodiment of the present invention.

Referring to FIG. 1, a magneto-optic recording medium 10 includes a transparent substrate 1, a recording layer 2 formed on transparent substrate 1, a reproducing layer 4 formed on recording layer 2, and a protection layer 5 formed on reproducing layer 4. Transparent substrate 1 is formed of glass, polycarbonate or the like. Recording layer 2 is formed of a magnetic material, such as TbFeCo. Reproducing layer 4 is formed of a magnetic material, such as GdFeCo. Protection layer 5 is formed of a transparent dielectric material, such as SiN.

Recording layer 2, reproducing layer 4 and protection layer 5 are successively deposited by magnetron sputtering. Recording layer 2 has a film thickness of 500 to 3000 Å, reproducing layer 4 has a film thickness of 50 to 1000 Å, and protection layer 5 has a film thickness of 180 to 220 Å.

Magneto-optic recording medium 10 has recording layer 2 closer to transparent substrate 1 and reproducing layer 4 closer to protection layer 5. Accordingly, radiation of laser beam for recording and reproduction is provided from the protection layer 5 side, rather than the transparent substrate 1 side.

It should be noted that recording layer 2 is not limited to the TbFeCo mentioned above, and may be a single- or multi-layered magnetic film formed of an element selected among Tb, Dy and Nd and Fe, Co and Ni, or a single- or multi-layered magnetic film formed of one element of Pt and Pd and one element selected among Fe, Co and Ni.

Reproducing layer 4 is not limited to the GdFeCo mentioned above, and may be a magnetic film formed of one element selected among GdFe, GdCo and TbCo or among Ho, Gd, Tb and Dy and one element selected among Fe, Co and Ni.

Figure 2:
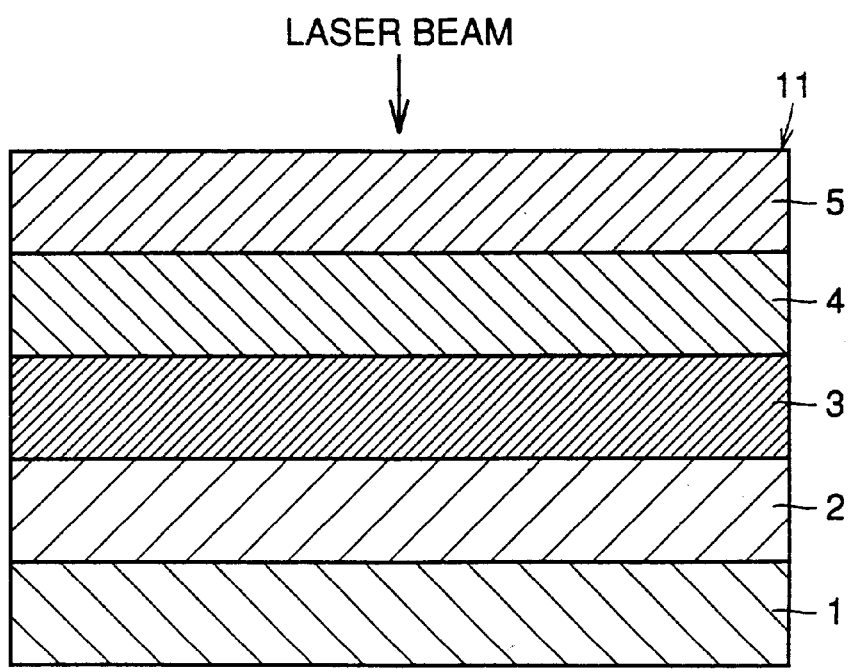
FIG. 2 shows a cross section showing another example of the magneto-optic recording medium.

Furthermore, as shown in a magneto-optic recording medium shown in FIG. 2, an intermediate layer 3 may be inserted between recording layer 2 and reproducing layer 4. Intermediate layer 3 is formed of a non-magnetic material (i.e. a dielectric material), such as SiN, AlN, TiN, $SiO_2$, $Al_2O_3$, SiC, TiC, ZnO, SiAlON, ITO (idium tin oxide) and $SnO_2$, and has a film thickness of 30 to 300 Å. By inserting intermediate layer 3, a domain with a stable shape can be formed in reproducing layer 4 in enlarging and reproducing the domain, as described later.

Desirably, minimum size of stable domain of reproducing layer 4 is larger than that of recording layer 2, since the process is not required for enlarging a domain transferred from recording layer 2 to reproducing layer 4 and accordingly the necessity of applying an alternating magnetic field to magneto-optic recording medium 10 or 11, as described later, can be dispensed with. Magnetic materials with a large the minimum size of stable domain is applicable to reproducing layer 4 of either of magneto-optic recording medium 10 or 11.

A configuration of the magneto-optic recording medium reproduction device according to the first embodiment of the present invention will now be described for reproducing a signal from magneto-optic recording medium 10 or 11.

Figure 3:
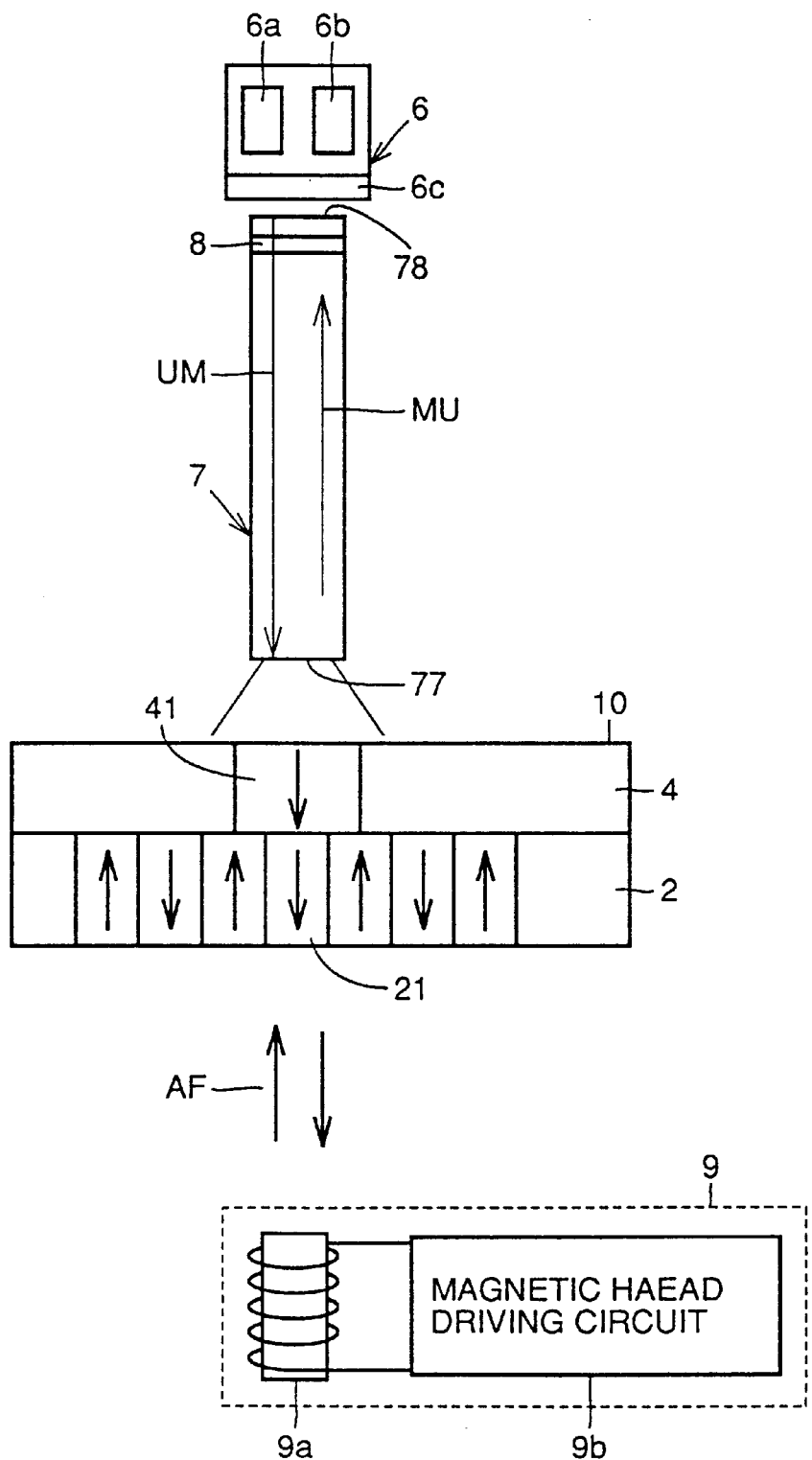
FIG. 3 shows a configuration of the magneto-optic recording medium reproduction device according to the first embodiment together with its reproduction principle.

Referring to FIG. 3, the reproduction device includes a receiving/emitting unit 6, an optical fiber 7 and a magnetic head 9.

Optical fiber 7 has an end surface 77 arranged adjacent to magneto-optic recording medium 10. The distance between end surface 77 and a surface of magneto-optic recording medium 10 is, for example, 0.2 μm (with a tolerance of ±0.1 μm).

Emitting/receiving unit 6 arranged on the surface 78 side of optical fiber 7 and includes a semiconductor laser 6a, a photodetector 6b and a hologram plate 6c. Semiconductor laser 6a provides oscillation of laser beam with a wavelength of 635 nm (with a tolerance of ±15 nm) or a wavelength of 680 nm (with a tolerance of ±15 nm), which is provided to end surface 78 of optical fiber 7. Photodetector 6b is arranged next to semiconductor laser 6a and receives laser beam from end surface 78 of optical fiber 7. Hologram plate 6c includes a glass substrate and a hologram formed on the glass substrate, and splits incident laser beam into the 0th-order, ±first-order, . . . ±nth-order diffracted beams. Accordingly, 0th-order diffracted beam (i.e., a beam transmitted straight through hologram plate 6c without diffraction) of laser beam radiated from semiconductor laser 6a and transmitted through hologram plate 6c enters end surface 78 of optical fiber 7. Meanwhile, +first-order or −first-order diffracted beam of laser beam radiated from end surface 78 of optical fiber 7 and transmitted through hologram plate 6c enters photodetector 6b.

Optical fiber 7 receives laser beam from semiconductor laser 6a via end surface 78, guides the laser beam in the UM direction in the figure, and irradiates magneto-optic recording medium 10 with the laser beam via end surface 77. Optical fiber 7 also receives laser beam reflected from magneto-optic recording medium 10 via end surface 77, guides the laser beam in the MU direction in the figure, and irradiates hologram plate 6b with the laser beam via end surface 78. Formed in optical fiber 7 is a polarizing filter 8 which transmits only laser beam deflecting in a specific direction. In this example, polarizing filter 8 is formed to transmit only laser beam which deflects in the direction perpendicular to the plane of the drawing. Semiconductor laser 6a is arranged so that laser beam radiated therefrom is polarized in the direction perpendicular to the plane of the drawing. Thus, laser beam radiated from semiconductor laser 6a will not be blocked by polarizing filter 8.

Magnetic head 9 includes an electromagnetic coil 9a and an magnetic head driving circuit 9b for supplying alternating current to electromagnetic coil 9a. Thus, electromagnetic head 9 applies an alternating field AF to magneto-optic recording medium 10, expands a domain transferred into reproducing layer 4 depending on a recording domain 21 in recording layer 2, and thus forms and shrinks a domain 41 which is larger than recording domain 21. The magnitude of alternating field AF ranges from 50 to 300 Oe. The pulse width of alternating field AF ranges from 20 to 500 nsec.

Figure 4A:
FIG. 4A represents the refractive index of the optical fiber shown in FIG. 3.
Figure 4B:
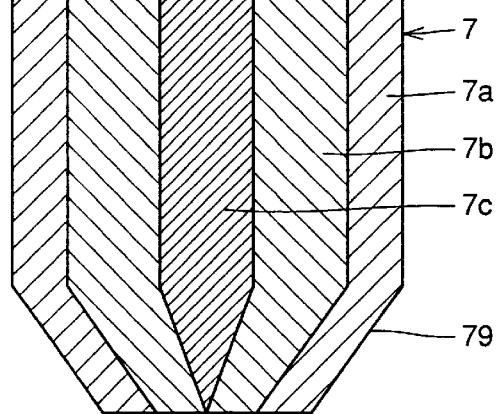
FIG. 4B shows a cross section showing a configuration of the optical fiber.

Optical fiber 7 is a multi-clad, step index optical fiber as shown in FIGS. 4A and 4B, and includes a core 7c with a refractive index n1 (e.g., 1.50 to 1.70), an inner circumferential clad 7b formed around core 7c and having a refractive index n2 (e.g., 1.45 to 1.65), and an outer circumferential clad 7a formed around inner circumferential clad 7b and having a refractive index n3 (e.g., 1.40 to 1.60). Refractive index n3 is smaller than refractive index n2, and refractive index n2 is smaller than refractive index n1. Suitable materials for core 7c, inner circumferential clad 7b and outer circumferential clad 7a are multi-component glass, plastic and the like of $SiO_2$ which contains $Na_2O$, CaO and Geo each having a different component ratio from each other.

Furthermore, a tip of optical fiber 7 is desirably tapered 79 such that the diameter of the tip of optical fiber 7 is smaller than that of the body of optical fiber 7. In this example, a tip of inner circumferential clad 7b has a diameter of 0.1 μm (with a tolerance of ±0.05 μm) and the body has a diameter of 300 μm (with a tolerance of ±100 μm).

Figure 4C:
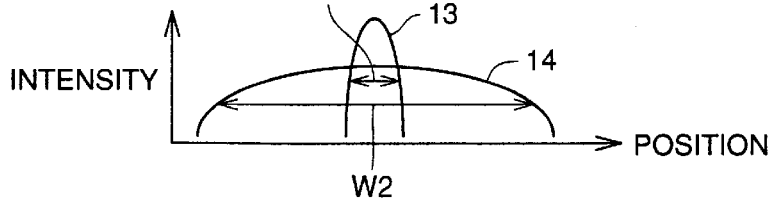
FIG. 4C represents intensity distributions of laser beams emanating from the optical fiber.

For optical fiber 7 as described above, laser beam proceeds through core 7c as well as inner circumferential clad 7b. Laser beam which has proceeded through core 7c forms on magneto-optic recording medium 10 a beam spot which has a sharp intensity distribution 13 with a narrow beam diameter W1, as shown in FIG. 4C. Meanwhile, a laser beam which has proceeded through inner circumferential clad 7b forms on magneto-optic recording medium 10 a beam spot which has a gentle intensity distribution 14 with a wide beam diameter W2, as shown in FIG. 4C. Thus, the mixed intensity distribution of these intensity distributions is extremely high only at the intensity of the center of the beam spot.

Figure 5A:
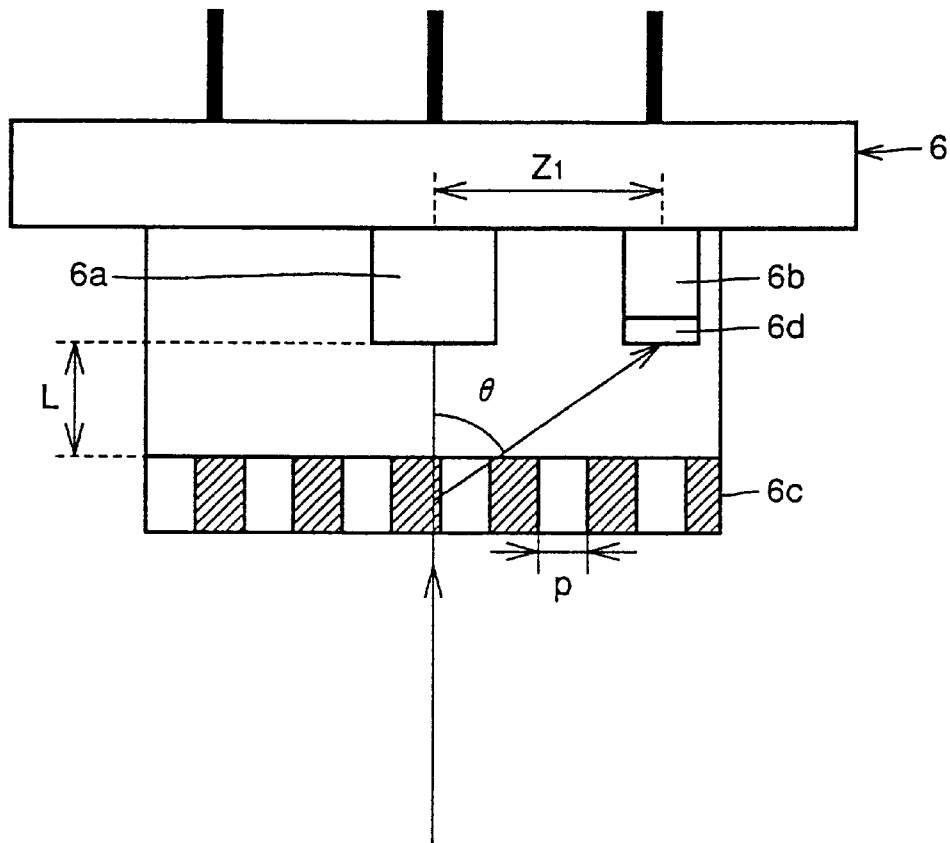
FIGS. 5A and 5B are front and bottom views showing a configuration of the receiving/emitting unit shown in FIG. 3, respectively.
Figure 5B:
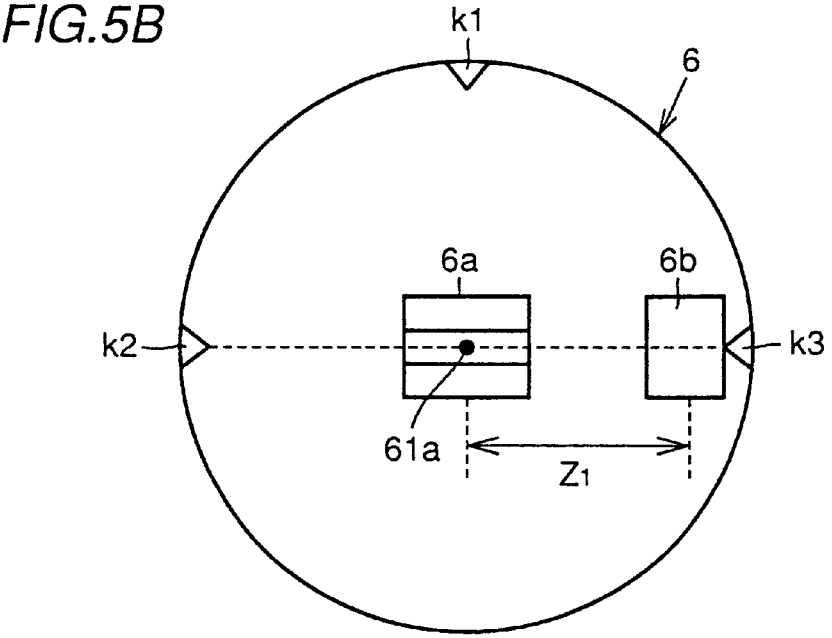

In emitting/receiving unit 6, semiconductor laser 6a and photodetector 6b are arranged in a same plane, as shown in FIG. 5A. Mounted on the light receiving surface of photodetector 6b is a polarizing filter 6d which transmits one of p polarization component and s polarization component of a +first-order or −first-order diffracted beam $L_{211}$. Emitting/receiving unit 6 has three cuts k1–k3 each formed for every 90°. Semiconductor laser 6a is arranged such that semiconductor laser 6a has an emitting point 61 positioned on line k2–k3.

The following equations (1) and (2) are established:

$$\sin\theta = \lambda/p \quad (1)$$

$$Z_1 = L\tan\theta \quad (2)$$

wherein L represents the distance between semiconductor laser 6a and hologram plate 6c, p represents the pitch of a fine corrugated structure (indicated by vertical stripe in the figure) which forms a hologram of hologram plate 6c, θ represents ±first-order diffraction angle caused by hologram plate 6c, λ represents the wavelength of laser beam, and $Z_1$ represents the distance between semiconductor laser 6a and photodetector 6b.

Furthermore, the following equation (3) is established from equations (1) and (2):

$$Z_1 = L\lambda/(p^2 - \lambda^2)^{1/2} \quad (3).$$

Thus, as wavelength λ of laser beam is increased, ±first-order diffraction angle θ caused by hologram plate 6c is also increased. Consequently, distance $Z_1$ between semiconductor laser 6a and photodetector 6b is also increased. Distance $Z_1$ is also changed depending on distance L between semiconductor laser 6a and hologram plate 6c. Accordingly, with pitch p of hologram plate 6c and distance L between semiconductor laser 6a and hologram plate 6c as parameters, Table 1 shows calculated distances $Z_1$ between semiconductor laser 6a and photodetector 6b. When pitch p ranges from 1.5 to 35 μm and distance L ranges from 3 to 25 mm for a laser beam wavelength of 635 nm, distance $Z_1$ ranges from 0.45 to 2.2 mm. Accordingly, distance $Z_1$ is here set ranging from 0.45 to 2.2 mm and distance L ranging from 3 to 25 mm.

TABLE 1

| Pitch of hologram:p (μm) | Distance between emitting point and hologram:L (mm) | Distance between emission point and detection point for beam of 635 nm:$Z_1$(mm) | Distance between emission point and detection point for beam of 680 nm:$Z_2$(mm) |
| --- | --- | --- | --- |
| 1.5 | 3 | 1.4018 | 1.5258 |
| 2 | 3 | 1.0044 | 1.0846 |
| 3 | 5 | 1.0828 | 1.1636 |
| 3 | 4.5 | 0.9745 | 1.0473 |
| 3 | 4 | 0.8663 | 0.9309 |
| 5 | 5 | 0.6402 | 0.6864 |
| 4.5 | 15 | 2.1381 | 2.2930 |
| 5 | 15 | 1.9205 | 2.0591 |
| 8 | 15 | 1.1944 | 1.2796 |
| 10 | 10 | 0.6360 | 0.6816 |
| 10 | 15 | 0.9544 | 1.0224 |
| 10 | 8 | 0.5090 | 0.5453 |
| 8 | 10 | 0.7963 | 0.8531 |
| 5 | 10 | 1.2804 | 1.3728 |
| 3 | 10 | 2.1657 | 2.3272 |
| 8 | 25 | 1.9906 | 2.1327 |
| 10 | 25 | 1.5907 | 1.7039 |
| 15 | 25 | 1.0593 | 1.1345 |
| 20 | 25 | 0.7942 | 0.8505 |
| 25 | 25 | 0.6352 | 0.6803 |
| 30 | 25 | 0.5293 | 0.5668 |
| 35 | 25 | 0.4536 | 0.4858 |

Table 1 also shows a distance $Z_2$ between semiconductor laser 6a and photodetector 6b with use of semiconductor laser 6a which provides oscillation of laser beam with a wavelength of 680 nm. When pitch p of hologram plate 6c ranges from 1.5 to 35 μm and distance L between semiconductor laser 6a and hologram plate 6c ranges from 3 to 25 mm, distance $Z_2$ ranges from 0.48 to 2.3 mm. Accordingly, distance $Z_2$ in this example is set ranging from 0.48 to 2.3 mm and distance L ranging from 3 to 25 mm.

Although hologram plate 6c is arranged in emitting/receiving unit 6 such that hologram plate 6c is integrated with semiconductor laser 6a and photodetector 6b, hologram plate 6c may be arranged separately from emitting/receiving unit 6. Although emitting/receiving unit 6 is provided with hologram plate 6c, as shown in FIG. 5A, a half mirror may be provided between end surface 78 of the optical fiber and semiconductor laser 6a to reflect laser beam $L_{21}$ reflected from magneto-optic recording medium 10 such that laser beam $L_{21}$ is perpendicular to photodetector 6b.

An operation of the magneto-optic recording medium reproduction device configured as above will now be described.

Figure 6:
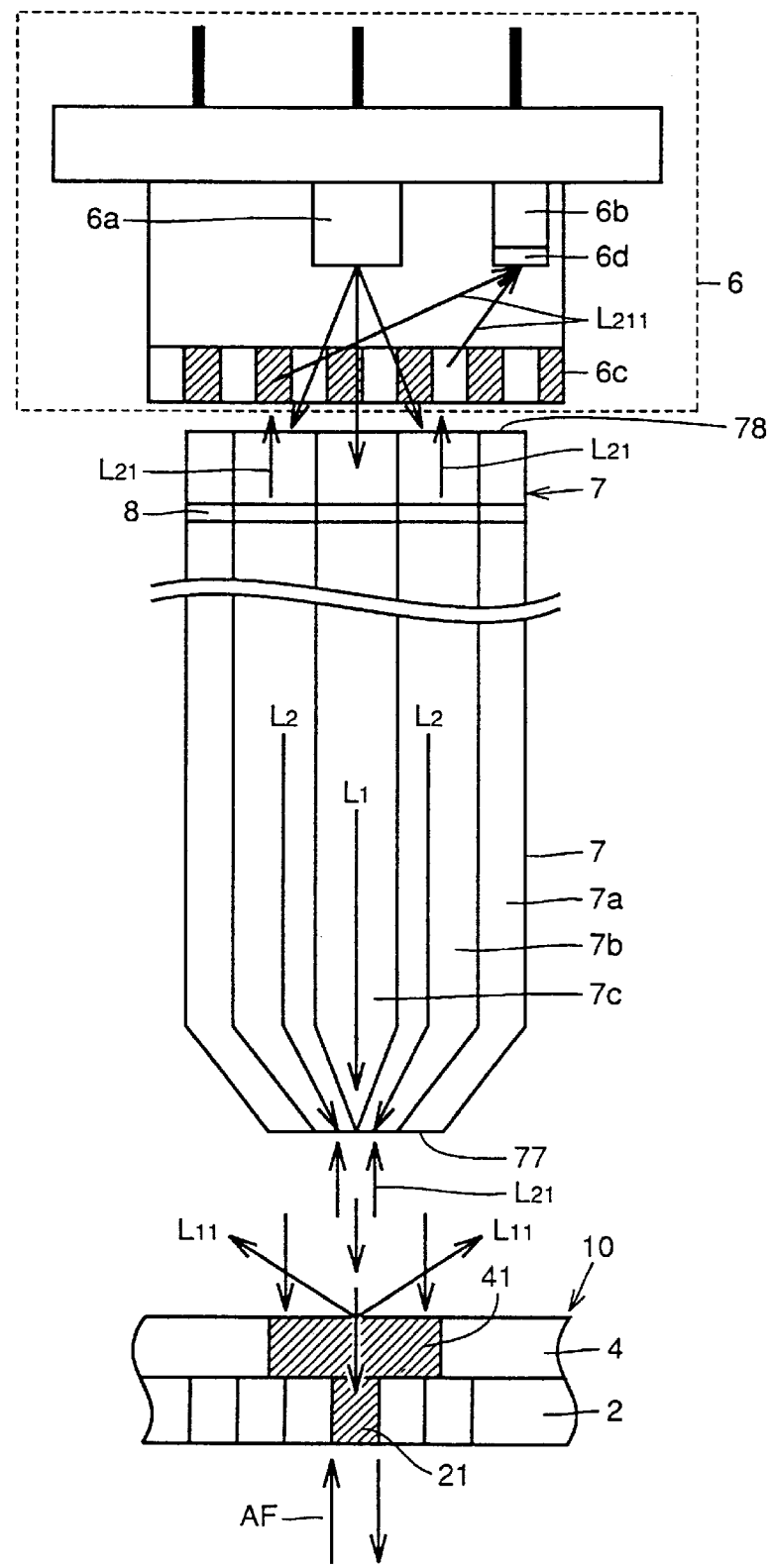
FIG. 6 shows a view for illustrating the reproduction operation of the reproduction device shown in FIG. 3.

As shown in FIG. 6, a laser beam with a wavelength of 635 nm that is radiated from emitting/receiving unit 6 at semiconductor laser 6a and is deflected in the direction perpendicular to the plane of the drawing diffuses and thus enters hologram plate 6c. The laser beam incident on hologram plate 6c is diffracted at hologram plate 6c and split into 0th-order, ±first-order, . . . ±nth-order diffracted beams. 0th-order diffracted beam is transmitted straight through hologram plate 6c without diffracting at hologram plate 6c, and enters end surface 78 of optical fiber 7. Since the laser beam radiated from semiconductor laser 6a is deflected in the direction perpendicular to the plane of the drawing, it is transmitted through polarizing filter 8 in optical fiber 7. Thus, a laser beam $L_1$ incident on core 7c proceeds through core 7c and is radiated from end surface 77 toward magnetic recording medium 10. Meanwhile, a laser beam $L_2$ incident on inner circumferential clad 7b proceeds through inner circumferential clad 7b and is radiated from end surface 77 towards magneto-optic recording medium 10.

Laser beam $L_1$, which has proceeded through core 7c, forms a beam spot with a sharp intensity distribution, as shown in FIG. 4C, and the diameter of the spot is 600 Å (with a tolerance of ±200 Å), which is almost the same size as recording domain 21 in recording layer 2. Thus, laser beam $L_1$ radiated onto magneto-optic recording medium 10 raises the temperature of only the area of recording domain 21 to a predetermined temperature or more.

Figure 7:
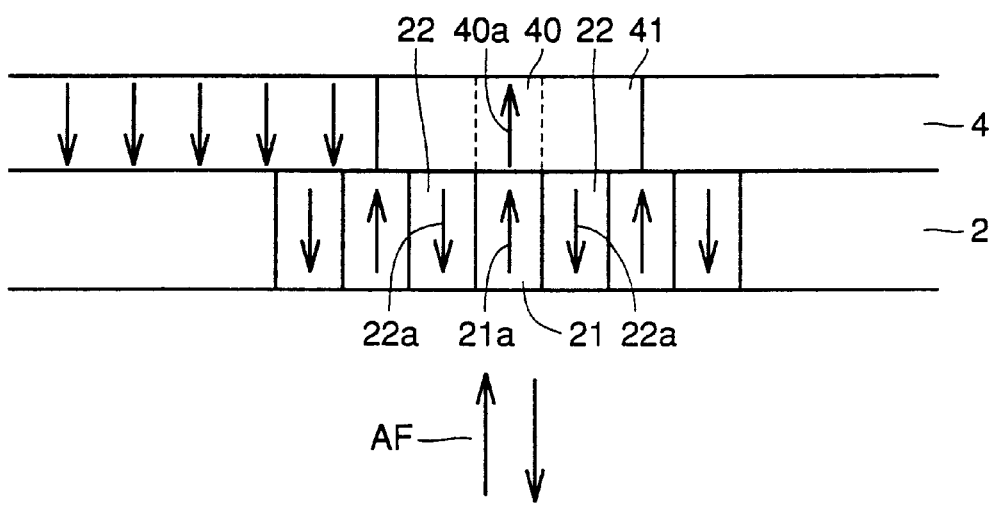
FIG. 7 shows a view for illustrating the transfer and expansion of a domain of the magneto-optic recording medium shown in FIG. 1.

When the temperature of recording domain 21 exceeds the predetermined temperature, recording domain 21 in recording layer 2 is transferred to reproducing layer 4 and a domain 40 which is approximately same in size as recording domain 21 is formed in reproducing layer 4, as shown in FIG. 7. A direction 40a in which domain 40 is magnetized is the same as a direction 21a in which recording domain 21 is magnetized.

When the direction of alternating field AF applied from magnetic head 9 is then the same as direction 40a in which the transferred domain 40 is magnetized, domain 40 is expanded in the plane of magneto-optic recording medium 10 to form a domain 41, which is larger than recording domain 21.

A laser beam $L_{11}$ of laser beam $L_1$ proceeding through core 7c that is reflected by the expanded domain 41 is diffused outward and will not return to end surface 77 of optical fiber 7. Meanwhile, a laser beam $L_{21}$ of laser beam $L_2$ proceeding through inner circumferential clad 7b that is reflected by the expanded domain 41 is not diffused outwards and will return to end surface 77 of optical fiber 7. Thus, laser beam $L_{21}$ incident on end surface 77 proceeds through core 7c and inner circumferential clad 7b in the opposite direction. Since the plane of polarization of laser beam $L_{21}$ reflected at the expanded domain 41 is slightly rotated due to Kerr effect, polarizing filter 8 transmits only a polarization component of laser beam $L_{21}$ proceeding through core 7c and inner circumferential clad 7b in the opposite direction that is the same in polarization direction as polarizing filter 8.

Laser beam $L_{21}$ transmitted through polarizing filter 8 is radiated from end surface 78 of optical fiber 7 towards hologram plate 6c to allow a +first-order or −first-order diffracted beam $L_{211}$ of laser beam $L_{21}$ incident on photodetector 6b via polarizing filter 6d. Photodetector 6b produces a reproduced signal according the incident, diffracted beam $L_{211}$. Since Kerr rotation angle is changed depending on the direction in which reproducing layer 4 is magnetized, the reproduced signal changes depending on the magnetization direction in reproducing layer 4.

Expanded domain 41 is shrunk when the direction of alternating field AF is opposite to magnetized direction 40a after detection of the reproduced signal. Repetition of the operation as described above allows signals to be successively reproduced from recording domains of recording layer 2.

In order to obtain a reproduced signal with high C/N ratio, a signal should be reproduced from a domain in reproducing layer 2 when the domain is expanded.

As shown in FIG. 7, reproducing layer 4 is magnetized in one predetermined direction (in this example, the downward direction in the figure) before domain 21 is transferred from recording layer 2. When magnetization direction 21a for recording domain 21 in recording layer 2 is transferred to domain 40 in reproducing layer 4 by exchanging coupling and the direction of alternating field AF is the same as magnetization direction 40a, domain 40 is expanded to domain 41. Thus, in order to obtain the maximum reproduced signal, photodetector 6b need only detector laser beam $L_{21}$ reflected from magneto-optic recording medium 10 when alternating field AF is applied in the direction opposite to the initial magnetization direction for reproducing layer 4 (i.e., in the upward direction in the figure).

In reproducing a signal from recording domain 22 with magnetization direction 21a and an opposite magnetization direction 22a for recording domain 21, a recording layer has already been substantially transferred and expanded, since the initial magnetization direction for reproducing layer 4 is the same as magnetization direction 22a for domain 22 to be reproduced. Accordingly, the transfer, expansion and erasure of magnetization are observed only with respect to a recording domain which is magnetized in a direction opposite to the initial magnetization direction for reproducing layer 4. Consequently, photodetector 6b need only detect laser beam $L_{21}$ reflected from magneto-optic recording medium 10 when alternating field AF is applied in a direction opposite to the initial magnetization direction for reproducing layer 4.

Note that for an initial magnetization direction for reproducing layer 4 opposite to that shown in FIG. 7, transfer of magnetization and expansion of a domain are observed when a signal is reproduced from recording domain 22. Accordingly, to obtain the maximum reproduced signal, photodetector 6b need only detect laser beam $L_{21}$ reflected from magneto-optic recording medium 10 while alternating field AF is applied in the same direction as magnetization direction 22a for recording domain 22.

The description hereinabove has been provided with respect to reproducing a signal from magneto-optic recording medium 10 shown in FIG. 1. The description hereinafter is provided with respect to reproducing a signal from magneto-optic recording medium 11 shown in FIG. 2.

Figure 8:
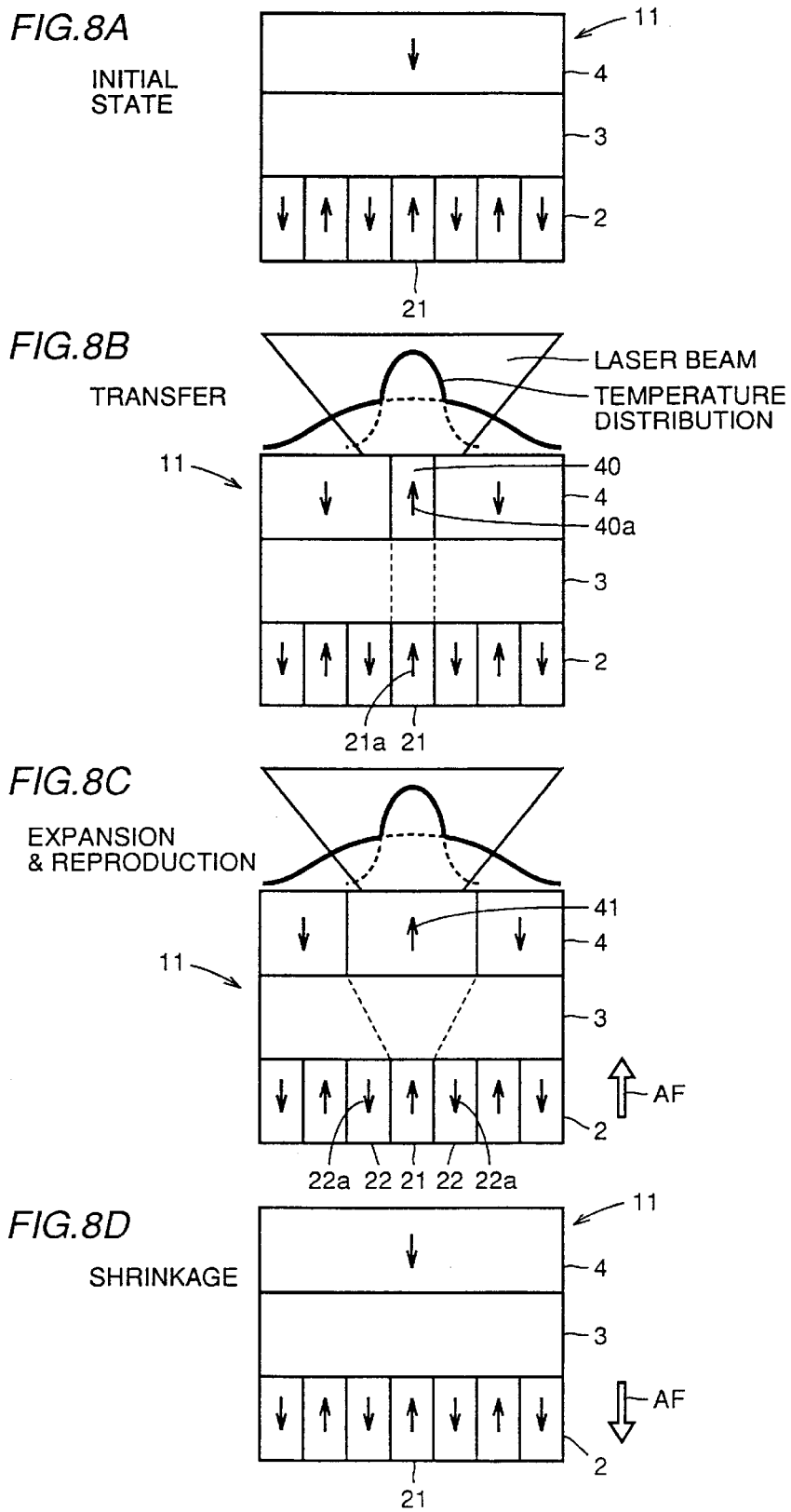
FIGS. 8A–8D show views of the steps for illustrating the reproduction principle of the magneto-optic recording medium shown in FIG. 2.

As shown in FIG. 8A, reproducing layer 4 is magnetized in one predetermined direction (i.e., the upward and downward directions in the figure).

As shown in FIG. 8B, when laser beam $L_1$ with a sharp temperature distribution then illuminates magneto-optic recording medium 11, magnetization direction 21a in recording domain 21 as the illuminated position is transferred to reproducing layer 4 to form domain 40 with a magnetization direction opposite to an initial magnetization direction. The transfer is provided due to magnetostatic coupling rather than exchange coupling, since non-magnetic intermediate layer 3 is formed between recording layer 2 and reproducing layer 4.

As shown in FIG. 8C, when the direction of alternating field AF is then same as magnetization direction 40a in domain 40, domain 40 is expanded as shown in FIG. 8C to form domain 41, which is larger than recording domain 21. Laser beam $L_{21}$ reflected from the expanded domain 41 is detected by photodetector 6b to generate a reproduced signal.

It should be noted that since intermediate layer 3 is formed between recording layer 2 and reproducing layer 4, the magnetic wall of domain 41 is not fixed by recording domain 22, which is adjacent to recording domain 21 and has the opposite magnetization direction 22a. Thus, a domain can be expanded more stably than in magneto-optic recording medium 10 without intermediate layer 3.

Then, as shown in FIG. 8D, the expanded domain 41 is shrunk when the direction of alternating field AF is the same as the initial magnetization direction for reproducing layer 4.

With recording layer 2 and reproducing layer 4 of magneto-optic recording media 10 and 11 shown in FIGS. 1 and 2 formed successively from the substrate 1 side, laser beam is radiated from the opposite, protection layer 5 side, since radiating a laser beam from the thin protection layer 5 side allows end surface 77 of optical fiber 7 to be arranged closer to recording and reproducing layers 2 and 4 of magneto-optic recording medium 10 and 11 than radiating a laser beam from the thick substrate 1 side.

Figure 9:
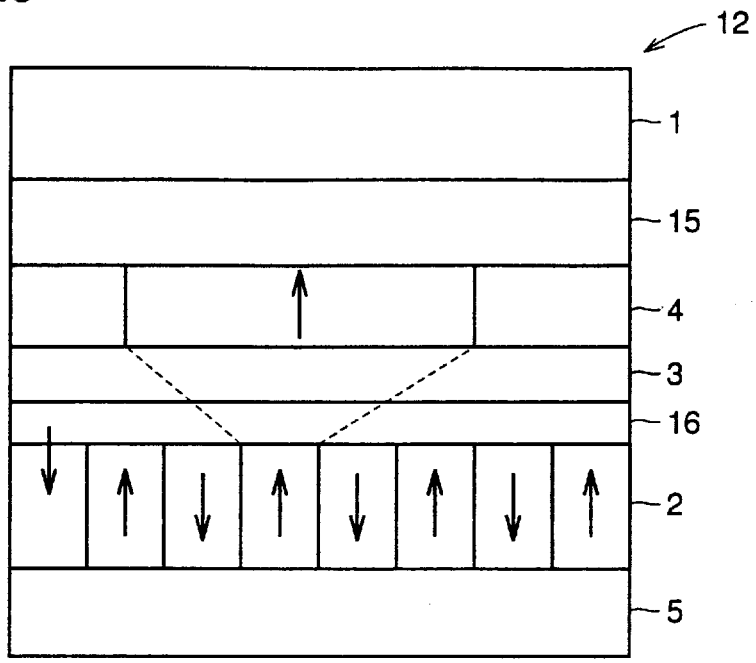
FIG. 9 shows still another example of the magneto-optic recording medium together with its reproduction principle.

As shown in FIG. 9, however, a magneto-optic recording medium 12 with reproducing layer 4 and recording layer 2 formed successively from the substrate 1 side can also provide reproduction by the reproduction device. Magneto-optic recording medium 12 has an optical interference layer 15 of SiN or the like formed between substrate 1 and reproducing layer 4 to enhance the reproducing signal. Formed between intermediate layer 3 and recording layer 2 is a shield layer 16 of AlTi or the like for separating recording layer 2 more completely from reproducing layer 4.

According to the first embodiment, optical fiber 7 has end surface 77 arranged adjacent to magneto-optic recording medium 10 which is then irradiated with laser beam via end surface 77. Thus, a signal can be accurately reproduced even from small recording domain 21 of e.g., 600 Å.

Figure 10A:
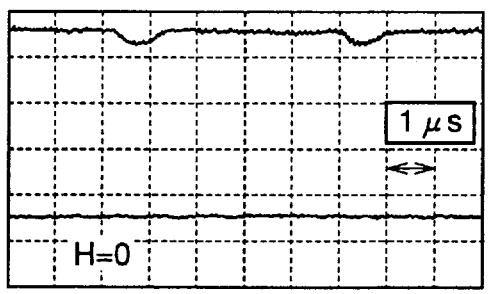
FIGS. 10A and 10B show waveform diagrams representing a magnetic field applied and reproduced signals obtained in the reproduction device shown in FIG. 3.
Figure 10B:

Furthermore, since alternating field AF is applied to recording medium 10, domain 40 transferred from recording layer 2 to reproducing layer 4 is expanded and a signal is reproduced from the expanded domain 41. Consequently, a large reproduced signal can be obtained. When an alternating field is not applied (H=0), an obtained reproduced signal is extremely small, as shown in FIG. 10A. By contrast, when an alternating field is applied, a large reproduced signal can be obtained, as shown in FIG. 10B.

Furthermore, since optical fiber 7 is a multi-clad, step index optical fiber, the intensity distribution of laser beam $L_1$ proceeding through core 7c has a sharp shape and thus only an extremely small recording domain 21 can be transferred to reproducing layer 4. Consequently, precise reproduced signal can be obtained.

Since hologram plate 6c is provided for diffracting a laser beam reflected from a magneto-optic recording medium, semiconductor laser 6a and photodetector 6b can be arranged in a same plane. Furthermore, the use of emitting/receiving unit 6 into which semiconductor laser 6a, photodetector 6b and hologram plate 6c are integrated together allows reduction of the size of the entire reproduction device.

Second Embodiment

Figure 11A:
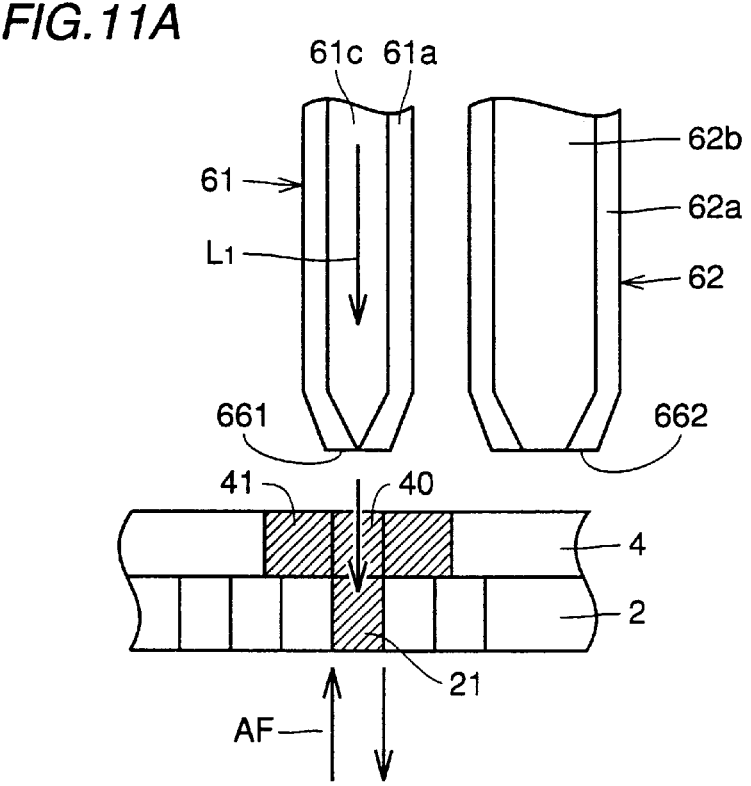
FIGS. 11A and 11B show a configuration of a magneto-optic recording medium according to a second embodiment of the present invention together with its reproduction principle.
Figure 11B:
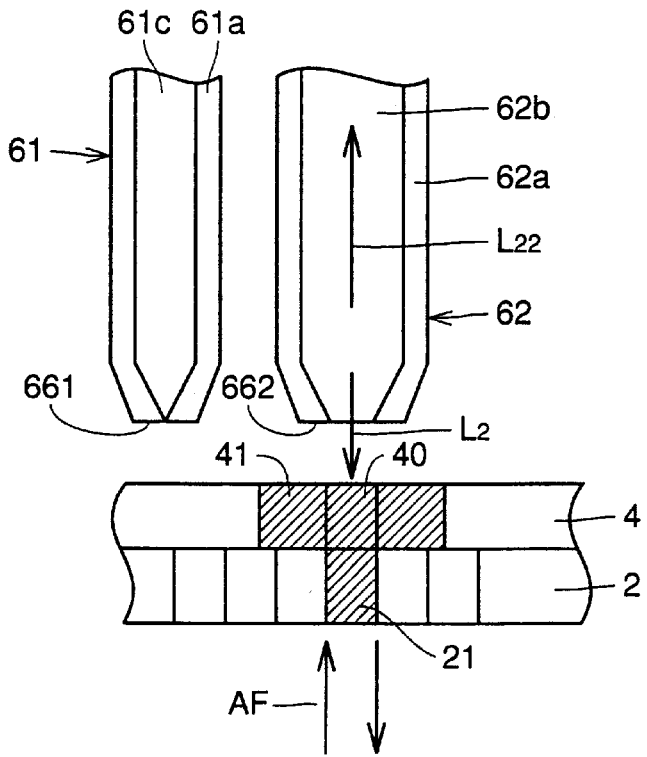

The single optical fiber 7 described above may be replaced with two optical fibers 61 and 62, as shown in FIGS. 11A and 11B. Optical fiber 61 irradiates magneto-optic recording medium 10 with laser beam for the transfer and expansion of a domain. Optical fiber 62 irradiates magneto-optic recording medium 10 with laser beam and also receives laser beam reflected from magneto-optic recording medium 10.

Optical fiber 61 for radiation has a core 61c with a refractive index ranging from 1.50 to 1.70, and a clad 61a which is formed around core 61c and has a refractive index ranging from 1.40 to 1.60. The refractive index of clad 61a is smaller than that of core 61c. Thus, optical fiber 61 is a single-clad, step index optical fiber.

Optical fiber 62 for reception has a core 62b with a refractive index ranging from 1.50 to 1.70, and a clad 62a which is formed around core 62b and has a refractive index ranging from 1.40 to 1.60. The refractive index of clad 62a is smaller than that of core 62b. Thus, optical fiber 62 is also a single-clad, step index optical fiber.

The diameter of core 62b of the receiving optical fiber 62 is larger than that of core 61c of the radiating optical fiber 61. Thus, optical fiber 61 radiates laser. beam $L_1$ which has a sharp intensity distribution 13 with a small, beam diameter W1, as shown in FIG. 4C. Optical fiber 62 radiates laser beam $L_2$ which has a broad intensity distribution with a large, beam diameter W2 shown in FIG. 4C.

A reproduction process of the reproduction device will now be described which employs the two optical fibers 61 and 62 as described above.

As shown in FIG. 11A, when laser beam $L_1$ proceeds through core 61c of optical fiber 61 and is then radiated to magneto-optic recording medium 10 via an end surface 661, the temperature of only recording domain 21 in recording layer 2 is raised to at least a predetermined temperature and recording domain 21 is transferred to reproducing layer 4 by exchange coupling to create domain 40 which is expanded to domain 41 by alternating field AF.

As shown in FIG. 11B, while domain 40 is expanded to domain 41, magneto-optic recording medium 10 is rotated and domain 40 (41) is thus moved under optical fiber 62. Thus, the expanded domain 41 is irradiated with laser beam which proceeds through core 62b of optical fiber 62 and is radiated via an end surface 662. Reflected laser beam $L_{22}$ of laser beam $L_2$ radiated to the expanded domain 41 returns to end surface 662 of optical fiber 62 and is detected by photodetector 6b, as in the first embodiment. The expanded domain 41 is shrunk by alternating field AF, as described above.

Third Embodiment

A magneto-optic recording medium reproduction device according to a third embodiment of the present invention includes a solid immersion lens 80, an objective lens 81, a semiconductor laser 82, a collimator lens 83, a semiconductor laser 84, a collimator lens 85, a half mirror 86, a photodetector 87 and a magnetic head 88.

Solid immersion lens 80 has a plane 80a adjacent to magneto-optic recording medium 10, and a spherical surface 80b opposite to plane 80a. Objective lens 81 is arranged on the curved surface 80b side of solid immersion lens 80 such that the optical axis of solid immersion lens 80 matches that of objective lens 80. Semiconductor laser 82 provides oscillation of laser beam with a wavelength of 635 nm. Collimator lens 83 forms parallel laser beam L81 based on the laser beam radiated from semiconductor laser 82. Collimator lens 85 forms parallel laser beam L82 based on the laser beam from semiconductor laser 84. The diameter D82 of laser beam L82 is larger than the diameter D81 of laser beam L81. Half mirror 86 mixes laser beams L81 and L82 to allow laser beams L81 and L82 coaxially incident on objective lens 81. Photodetector 87 receives laser beam reflected from magneto-optic recording medium 10 and transmitted through solid immersion lens 80 and objective lens 81. Magnetic head 88 applies alternating field AF to magneto-optic recording medium 10 and expands and shrinks a domain created in reproducing layer 4 of magneto-optic recording medium 10.

The reproduction device further includes a half mirror 89, a Wollaston prism 90, a condenser lens 91 and a differential amplifier 92. Half mirror 89 transmits laser beam L81 from collimator lens 83 straight and reflects laser beam reflected from magneto-optic recording medium 10 towards photodetector 87. Wollaston prism 90 splits laser beam reflected from half mirror 89 into p polarization component, s polarization component and laser beam mixed with s and p polarization components. Condenser lens 91 condenses laser beam transmitted through Wollaston prism 90 onto photodetector 87. Differential amplifier 92 generates a reproduced signal, depending on a signal generated by photodetector 87 based on the p polarization component and a signal generated by photodetector 87 based on the s polarization component. Note that photodetector 87 also generates an error signal for focusing control or tracking control based on the laser beam mixed with s and p polarization components.

A reproduction process of the reproduction device configured as described above will now be described.

Laser beam radiated from semiconductor laser 82 is rendered parallel by collimator lens 83 to form laser beam L81 with a small diameter D81. Meanwhile, laser beam radiated from semiconductor laser 84 is rendered parallel by collimator lens 85 to form laser beam L82 with a large diameter D82. Laser beam L81 is transmitted through half mirror 86 straight to allow laser beam L81 incident on objective lens 81. Meanwhile, laser beam L82 is reflected by half mirror 86 to allow laser beam L82 incident on object lens 81. Thus, the optical system formed of collimator lenses 83 and 85 and half mirror 86 forms laser beam L81 with diameter D81 and laser beam L82 with diameter D82 larger than diameter D81 and allows laser beams L81 and L82 coaxially incident on objective lens 81.

Figure 13:
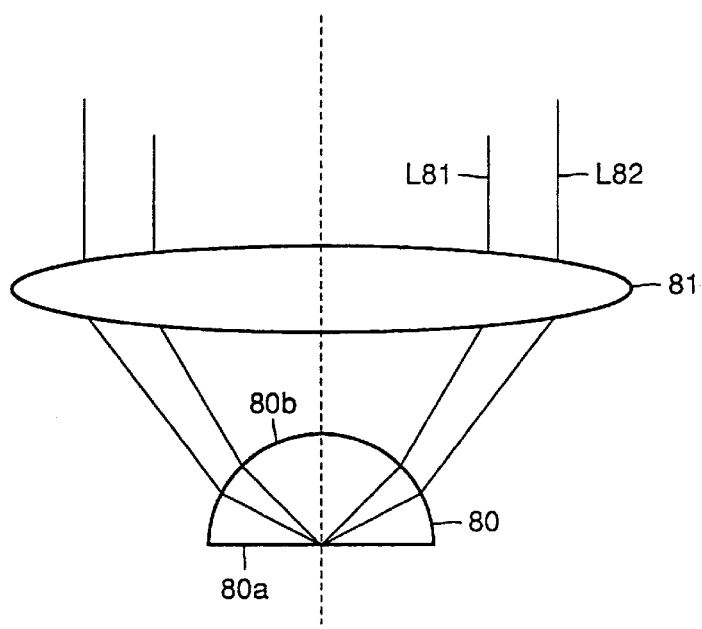
FIG. 13 shows an optical path passing through the solid immersion lens and objective lens shown in FIG. 12.
Figure 14A:
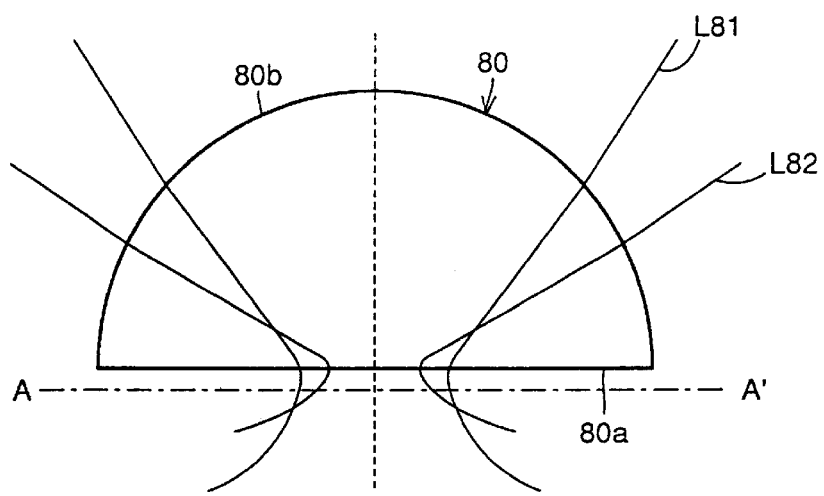
FIG. 14A shows more specifically an optical path of laser beam transmitted through the solid immersion lens shown in FIG. 13.
Figure 14B:
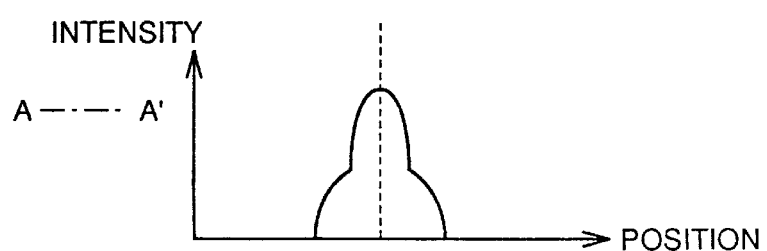
FIG. 14B represents the intensity distribution of the laser beam in plane A–A' in FIG. 14A.

Since two laser beams L81 and L82 different in diameter enter objective lens 81, as shown in FIG. 13, two laser beams L81 and L82 each enter the spherical surface of solid immersion lens 80 at a different angle. Thus, the spot diameter of laser beam L81 formed by solid immersion lens 80 is larger than that of laser beam L82 formed by solid immersion lens 80, as shown in FIG. 14A. Accordingly, the mixed intensity distribution of laser beams L81 and L82 in plane A–A' in FIG. 14A is as shown in FIG. 14B. This intensity distribution is similar to that shown in FIG. 4C, with the intensity of laser beam significantly larger at the center than at the outer circumference.

Consequently, laser beam from objective lens 81 is further condensed and only an extremely small recording domain of e.g., no more than 0.1 µm can be transferred to reproducing layer 4. Furthermore, since alternating field AF is applied to magneto-optic recording medium 10 by magnetic head 88, a domain created in reproducing layer 4 is expanded and the expanded domain is irradiated with laser beam L81 with a broad intensity distribution. Thus, the intensity of a reproduced signal detected by photodetector 87 is increased as well as the first and second embodiments.

Fourth Embodiment

Figure 12:
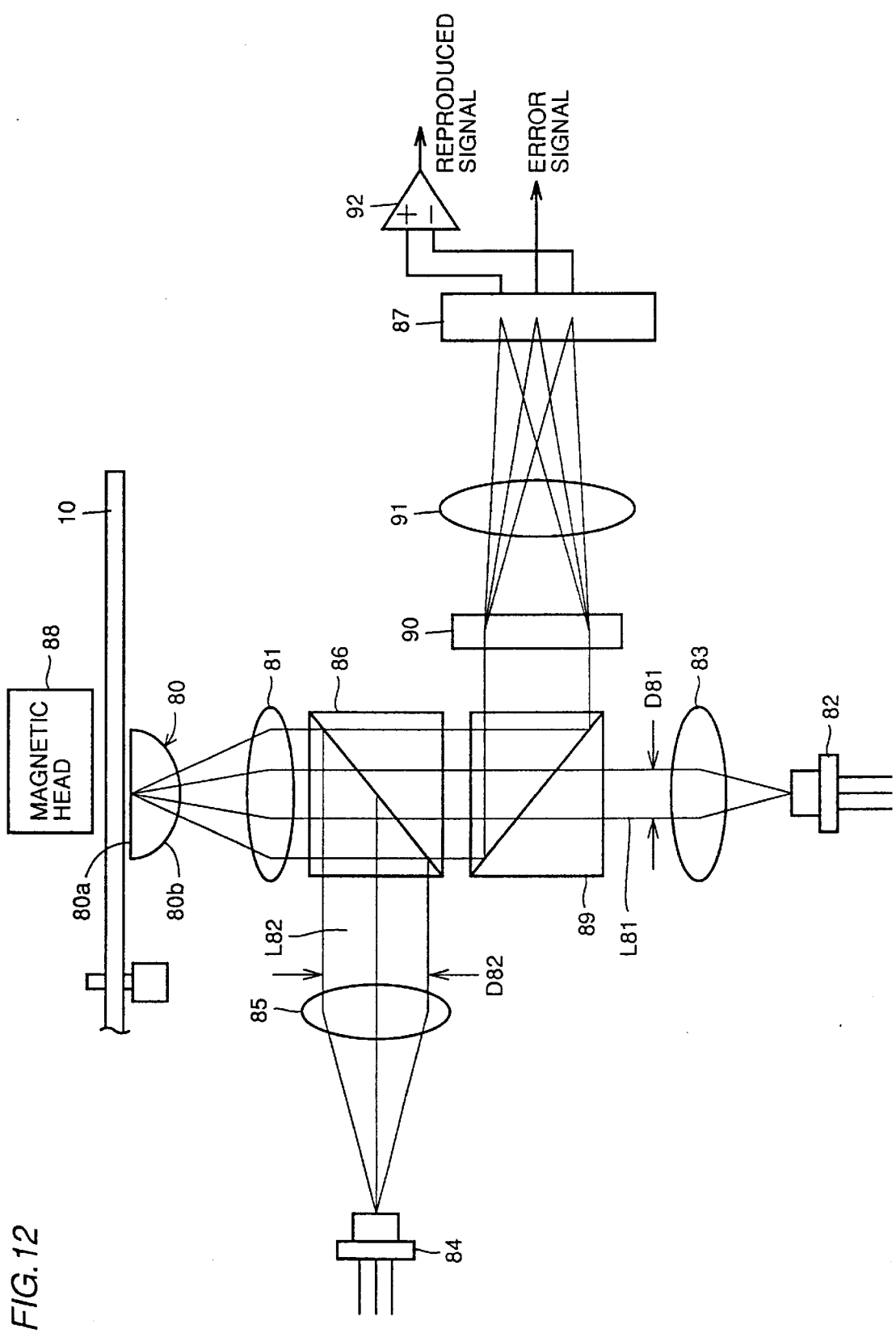
FIG. 12 shows a configuration of a magneto-optic recording medium reproduction device according to a third embodiment of the present invention.
Figure 15:
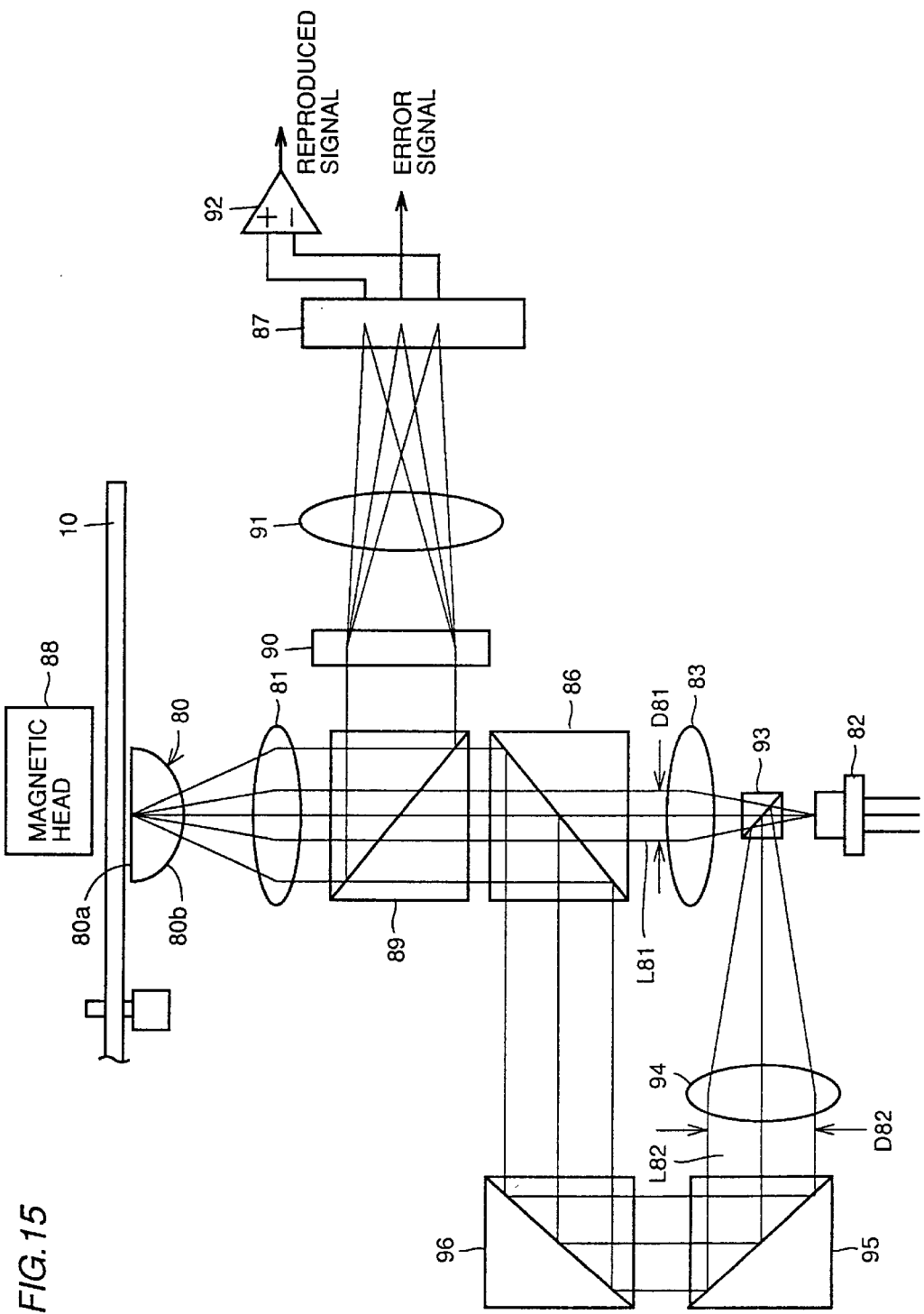
FIG. 15 shows a configuration of a magneto-optic recording medium reproduction device according to a fourth embodiment of the present invention.

As shown in FIG. 15, a magneto-optic recording medium reproduction device according to a fourth embodiment of the present invention includes the configuration of the third embodiment plus a beam splitter 93, a collimator lens 94 and reflecting mirrors 95 and 96. It should be noted, however, that the device is not provided with semiconductor laser 84 shown in FIG. 12 and is only provided with a single semiconductor laser 82. Collimator lens 94 replaces collimator lens 85 shown in FIG. 12. Although half mirrors 86 and 89 are opposite in arrangement to those shown in FIG. 12, half mirrors 86 and 89 in the fourth embodiment may also be arranged as shown in FIG. 12.

Beam splitter 93 splits laser beam radiated from semiconductor laser 82 into two by transmitting the laser beam straight and also reflecting the laser beam perpendicularly. Collimator lens 83 forms laser beam L81 with a small diameter D81, based on the laser beam transmitted straight through beam splitter 93. Collimator lens 94 forms laser beam L82 with a large diameter D82, based on the laser beam reflected from beam splitter 93 perpendicularly. Reflecting mirror 95 perpendicularly reflects laser beam L82 from collimator lens 94, and reflecting mirror 96 further reflects the laser beam reflected perpendicularly by reflecting mirror 95 towards half mirror 86 perpendicularly. Thus, the optical system formed of collimator lenses 83 and 94, half mirror 86, beam splitter 93 and reflecting mirrors 95 and 96 forms laser beam L81 with small diameter D81 and laser beam L82 with diameter D82 larger than diameter D81 and allows laser beams L81 and L82 coaxially incident on objective lens 81.

In the reproduction device configured as above, laser beam radiated from a single semiconductor laser 82 is split into two by beam splitter 93, based on a laser beam reflected perpendicularly by beam splitter 93, collimator lens 94 forms laser beam L82 with large diameter D82. perpendicularly. Thus, the reproduction device dispenses with semiconductor laser 84 as shown in FIG. 12.

It should be noted that it is desirable that the distance between end surface 77 of optical fiber 7 or plane 80a of solid immersion lens 80 and magneto-optic recording medium 10, 11, and 12 is always fixed and thus tracks are desirably formed in a same plane, rather than of the land and groove type. In this case, a signal for tracking control may be previously recorded in a magneto-optic recording medium and side beam as well as main beam may be radiated to read the recorded signal to provide tracking control.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magneto-optical recording medium reproduction device for reproducing a signal from a magneto-optical recording medium with a recording layer and a reproducing layer, comprising:

laser means for oscillating a laser beam, optical means having an end surface adjacent to said magneto-optical recording medium, for irradiating said magneto-optical recording medium with the laser beam from said laser means via said end surface and receiving a laser beam reflected from said magneto-optical recording medium via said end surface;

detection means for detecting the laser beam received by said optical means, and magnetic field application means for applying an alternating field having a pulse width that ranges from 20 to 500 nsec to said magneto-optical recording medium to expand and shrink a domain created in said reproducing layer, wherein said optical means includes an optical fiber including:

a core having a first refractive index;

a first clad formed around said core and having a second refractive index smaller than said first refractive index; and a second clad formed around said first clad and having a third refractive index smaller than said second refractive index.

2. A magneto-optical recording medium reproduction device for reproducing a signal from a magneto-optical recording medium with a recording layer and a reproducing layer comprising:

laser means for oscillating a laser beam;

optical means having an end surface adjacent to said magneto-optical recording medium, for irradiating said magneto-optical recording medium with the laser beam from said laser means via said end surface and receiving a laser beam reflected from said magneto-optical recording medium via said end surface;

detection means for detecting the laser beam received by said optical means:; and magnetic field application means for applying an alternating field having a pulse width that ranges from 20 to 500 nsec to said magneto-optical recording medium to expand and shrink a domain created in said reproducing layer, wherein said optical means includes:
a first optical fiber including a first core having a first diameter and a first refractive index, and a first clad formed around said first core and having a second refractive index smaller than said first refractive index; and
a second optical fiber including a second core having a second diameter larger than said first diameter and a third refractive index, and a second clad formed around said second core and having a fourth refractive index smaller than said third refractive index.

3. A magneto-optical recording medium reproduction device for reproducing a signal from a magneto-optical recording medium with a recording layer and a reproducing layer, comprising:
laser means for oscillating a laser beam;
optical means having an end surface adjacent to said magneto-optical recording medium, for irradiating said magneto-optical recording medium with the laser beam from said laser means via said end surface and receiving a laser beam reflected from said magneto-optical recording medium via said end surface;
detection means for detecting the laser beam received by said optical means; and
magnetic field application means for applying an alternating field having a pulse width that ranges from 20 to 500 nsec to said magneto-optical recording medium to expand and shrink a domain created in said reproducing layer,
wherein said optical means includes:
a solid immersion lens having said end surface and a curved surface opposite to said end surface;
an objective lens arranged on a said curved surface side of said solid immersion lens, coaxial with said solid immersion lens; and
an optical system forming first laser beam with a first diameter and a second laser beam with a second diameter larger than said first diameter and allowing said first and second laser beams coaxially incident on said objective lens.

4. The magneto-optical recording medium reproduction device according to claim 3, wherein:
said laser means includes
a first laser, and
a second laser; and
said optical system includes
a first lens forming said first laser beam, based on a laser beam from said first laser,
a second lens forming said second laser beam, based on a laser beam from said second laser, and
an optical mixing element for mixing said first laser beam and said second laser beam.

5. The magneto-optical recording medium reproduction device according to claim 3, wherein:
said laser means includes one laser; and
said optical system includes
an optical splitting element for splitting a laser beam from said laser into two laser beams,
a first lens forming said first laser beam, based on one laser beam split from the laser beam by said optical splitting element,
a second lens forming said second laser beam, based on the other laser beam split from the laser beam by said optical splitting element, and
an optical mixing element for mixing said first laser beam and said second laser beam.

6. A magneto-optical recording medium reproduction device for reproducing a signal from a magneto-optic recording medium with a recording layer and a reproducing layer comprising:
an optical fiber having one end surface adjacent to said magneto-optical recording medium and the other end surface;
a laser arranged on the other end surface side of said optical fiber for providing a laser beam to the other end surface of said optical fiber;
a photodetector arranged on the other end surface side of said optical fiber and receiving a laser beam from the other end surface of said optical fiber; and
a magnetic head arranged for applying an alternating field having a pulse width that ranges from 20 to 500 nsec to said magneto-optical recording medium to expand and shrink a domain created in said reproducing layer,
wherein said optical fiber includes:
a core having a first refractive index;
a first clad formed around said core and having a second refractive index smaller than said first refractive index; and
a second clad formed around said first clad and having a third refractive index smaller than said second refractive index.

7. A magneto-optical recording medium reproduction device for reproducing a signal from a magneto-optical recording medium with a recording layer and a reproducing layer, comprising:
a first optical fiber having one end surface adjacent to said magneto-optical recording medium and the other end surface;
a laser arranged on the other end surface side of said first optical fiber for providing a laser beam to the other end surface of said first optical fiber;
a second optical fiber having one end surface adjacent to said magneto-optical recording medium and the other end surface;
a photodetector arranged on the other end surface side of said second optical fiber and receiving a laser beam from the other end surface of said second optical fiber; and
a magnetic head arranged for applying an alternating field to said magneto-optical recording medium to expand and shrink a domain created in said reproducing layer.

8. The magneto-optical recording medium reproduction device according to claim 7, wherein:
said first optical fiber includes
a first core having a first diameter and a first refractive index, and a first clad formed around said first core and having a second refractive index smaller than said first refractive index; and
said second optical fiber includes
a second core having a second diameter larger than said first diameter and a third refractive index, and
a second clad formed around said second core and having a fourth refractive index smaller than said third refractive index.

9. A magneto-optical recording medium reproduction device for reproducing a signal from a magneto-optical recording medium with a recording layer and a reproducing layer, comprising:

a solid immersion lens having a plane adjacent to said magneto-optical recording medium and a curved surface opposite to said plane;

an objective lens arranged on the curved surface side of said solid immersion lens, coaxial with said solid immersion lens;

a laser;

an optical system for forming from a laser beam from said laser a first laser beam with a first diameter and a second laser beam with a second diameter larger than said first diameter and allowing said first and second laser beams coaxially incident on said objective lens;

a photodetector receiving a laser beam reflected from said magneto-optical recording medium and transmitted through said solid immersion lens and said objective lens; and a magnetic head arranged for applying an alternating field to said magneto-optical recording medium to expand and shrink a domain created in said reproducing layer.

10. A magneto-optical recording medium reproduction device for reproducing a signal from a magneto-optical recording medium with a recording layer and a reproducing layer, comprising:

a solid immersion lens having a plane adjacent to said magneto-optical recording medium and a curved surface opposite to said plane;

an objective lens arranged on the curved surface side of said solid immersion lens, coaxial with said solid immersion lens;

a first laser;

a first lens forming a first laser beam with a first diameter, based on a laser beam from said first laser;

a second laser;

a second lens forming a second laser beam with a second diameter larger than said first diameter, based on a laser beam from said second laser;

an optical system for allowing said first and second laser beams coaxially incident on said objective lens;

a photodetector receiving a laser beam reflected from said magneto-optical recording medium and transmitted through said solid immersion lens and said objective lens; and a magnetic head arranged for applying an alternating field to said magneto-optical recording medium to expand and shrink a domain created in said reproducing layer.

* * * * *